United States Patent [19]
Desnoyers et al.

[11] Patent Number: 5,927,181
[45] Date of Patent: Jul. 27, 1999

[54] DEEP FAT FRYER WITH REMOVABLE VESSEL

[75] Inventors: Jean-Claude Desnoyers, Curtil Vergy; Bernard Beugnot, Is Sur Tille, both of France

[73] Assignee: SEB S.A., Ecully, France

[21] Appl. No.: 09/029,566

[22] PCT Filed: Jul. 1, 1997

[86] PCT No.: PCT/FR97/01179

§ 371 Date: Mar. 3, 1998

§ 102(e) Date: Mar. 3, 1998

[87] PCT Pub. No.: WO98/01064

PCT Pub. Date: Jan. 15, 1998

[30] Foreign Application Priority Data

Jul. 3, 1996 [FR] France ................................ 96 08495

[51] Int. Cl.$^6$ ................................ A47J 37/12; H05B 1/02
[52] U.S. Cl. ................................ 99/330; 99/337; 99/403; 126/374; 126/391; 219/438; 219/441
[58] Field of Search ................................ 99/330, 331, 337, 99/403–407, 410–418, 338; 126/391, 21 A, 374; 210/167, DIG. 8; 219/494, 449, 497, 436, 438, 441; 364/400, 528.41, 528.35; 426/438, 231; 392/405, 477

[56] References Cited

U.S. PATENT DOCUMENTS

| | | | |
|---|---|---|---|
| 4,103,604 | 8/1978 | Berard ................................ | 99/403 X |
| 4,503,320 | 3/1985 | Polster ................................ | 219/441 |
| 4,574,183 | 3/1986 | Knauss ................................ | 219/438 |
| 4,691,096 | 9/1987 | Knauss ................................ | 219/441 |
| 4,751,915 | 6/1988 | Price ................................ | 126/391 |
| 4,785,725 | 11/1988 | Tate et al. ................................ | 99/330 |
| 4,998,007 | 3/1991 | Knauss ................................ | 99/403 X |
| 5,575,194 | 11/1996 | Maher, Jr. et al. ................................ | 99/330 |
| 5,839,360 | 11/1998 | Williams ................................ | 210/167 X |

FOREIGN PATENT DOCUMENTS

| | | |
|---|---|---|
| 94 11533 | 3/1996 | France . |
| 598 794 | 5/1978 | Switzerland . |
| 96 05761 | 2/1996 | WIPO . |

Primary Examiner—Timothy F. Simone
Attorney, Agent, or Firm—Pillsbury Madison & Sutro

[57] ABSTRACT

Cooking apparatus having a removable vessel (3) intended to contain a cooking medium (9) and food to be cooked, comprising a frame (1) in which is provided a housing (2) intended to receive the vessel (3), heating device (4) disposed at the bottom of said housing (2), control device (5) in thermal communication with the vessel (3) permitting control of the level of temperature of the vessel (3), overheating protection device (6) and thermal communication with the vessel (3) permitting to avoid that the level of temperature of the vessel (3) exceeding a pre-established safety threshold, device (7) for detecting the presence of the vessel (3), characterized in that the control device (5) are capable of provoking an interruption of the feed circuit of the heating device (4) before the overheating protection device (6) are activated, when the vessel (3) comprises less cooking medium (9) than minimum quantity indicated.

13 Claims, 4 Drawing Sheets

DEEP FAT FRYER WITH REMOVABLE VESSEL

This application is the national phase of international application PCT/FR97/011779 filed Jul. 1, 1997.

BACKGROUND OF THE INVENTION

The present invention relates to the general technical field of heating or cooking apparatus conceived for frying in a bath of oil in particular.

The present invention concerns a cooking apparatus for food, in particular for frying in a bath of oil, comprising a vessel mounted in a removable manner in a frame, as well as heating means disposed in the vessel, which are associated with heat-controlling means, heat protection means and means for detecting the presence of the vessel.

The present invention concerns more particularly, but not exclusively, an electric fryer with a removable vessel intended for cooking foods such as french fries, meat or fish, and comprising means for detecting the presence of the vessel.

Conventional electric fryers having a fixed tank have been known for a number of years. Current models comprise in particular a thermal isolation of the lateral walls providing better safety against the risks of burning by contact. Nevertheless, cleaning of these apparatus remains a difficult operation, despite the presence of a removable lid.

Fryers having a removable vessel can be cleaned much better, particularly when the removable vessel is covered with a protective layer of a non-stick material such as PTFE. Nevertheless, these apparatus are often costly and complex. These apparatus, in order to satisfy safety norms, must include devices which prevent their utilization when they are in a bad configuration, for example, the absence of a vessel, poor positioning of the vessel, even insufficient filling of the vessel.

The document WO-A-96/05761 presents particularly a fryer with a removable vessel comprising a safety device intended to interrupt the electric supply when the vessel is not sufficiently filled, or when the vessel is not present in the frame of the apparatus. In these two cases, it is a question of assuring the safety of the user and avoiding any damage which can be caused to the apparatus.

This device comprises detection means adapted on the one hand to detect if the vessel is substantially empty and in this case to open the electric supply circuit for the heating means, and on the other hand to detect if the vessel is filled in a manner to achieve a preestablished minimum weight, in order in this case to close the supply circuit for the heating means, as well as means adapted to close or open the electric supply circuit for the heating means when the removable vessel is respectively present or absent in the frame.

Such a device quite obviously permits protecting the user from a dangerous or harmful situation which can be created by placing the heating means into operation while the apparatus is not in a normal configuration. This device permits in particular avoidance of overheating due to heating while empty, likely to lead to the melting of the thermal protection fuse of the apparatus.

This device nevertheless has a number of pieces in order to perform the safety functions corresponding to the different cases to be considered: vessel missing, absence or two small a quantity of cooking cofactor or medium in the vessel. Taking into account the weight of the vessel to permit functioning of the apparatus implies the utilization of calibrated biassing means. This device is consequently complex and thus costly.

BRIEF SUMMARY OF THE INVENTION

The present invention thus aims at proposing a fryer permitting the different inconveniences cited above to be remedied, capable of offering a practical and convenient utilization for the user all while being of a simple design requiring as little as possible of complex devices.

These goals are realized in a cooking apparatus, notably a fryer, with a removable vessel intended to contain the cooking cofactor and the food to be cooked, comprising a frame in which is provided a housing intended to receive the vessel, heating means disposed at the bottom of said housing, control means in thermal communication with the vessel permitting control of the level of temperature of the vessel, means for protection against overheating in thermal communication with the vessel permitting to prevent the level of temperature of the vessel from exceeding a pre-established security threshold, means for detecting the presence of the vessel, characterized in that the control means are capable of provoking an interruption of the supply circuit of the heating means before the protection means are activated, when the vessel comprises less cooking cofactor than the minimum indicated quantity.

The user thus has available an apparatus whose utilization is practical and pleasant. In effect the means for protecting against overheating generally utilized in fryers are of the fuse type, and experience an irreversible degradation when they are activated. The user can then not place the appliance back in operation himself. With the operating characteristic which is the object of the present invention, the user does not experience the inconvenience of having to have the apparatus repaired after it has been used with two small a quantity of fat, or when the apparatus was placed into operation without having added fat. This operating characteristic permits use of a very simple system for the detection of the presence of the vessel, since the only parameter to take into account is the correct presence of the vessel. This simplification of the design contributes to obtaining an apparatus which is inexpensive to fabricate. In addition, this apparatus is very easy to obtain due to its removable vessel which can be hand-washed outside of the apparatus and even washed in a dishwasher.

According to an advantageous version of the invention, the control means are arranged in a wall of the housing and comprise at least one connecting element provided to assure a thermal communication between the control means and the vessel placed in operating position in the housing, said element being movably mounted in a manner to be able to project into the housing beyond the wall of the housing in the direction of the wall of the vessel.

Advantageously, the connecting element is mounted on a plate supporting the control means and movably mounted with respect to the frame.

In an advantageous manner, the connecting element is disposed in a manner to exert a mechanical contact against the vessel when the latter is placed in operating position.

The thermal communication by conduction between the hot vessel and the control means permits attainment of better control characteristics.

Advantageously, the plate comprises means for positioning with respect to the vessel, distinct from the connecting element, disposed to assure a reproducible contact of the connecting element with the vessel.

The utilization of such a plate permits the control means to be placed at a constant distance from the vessel, independently of the actual geometry of the vessel utilized, due to industrial fabrication tolerances, and thus independent of the relative position of the wall of said vessel with respect to the wall of the frame to which the control means are connected, independent also of thermal dilations of the vessel during use of the apparatus. It also permits assurance of a contact offering a good reproducibility of angular positioning between the connecting element and the vessel. The thermal image obtained by the control means is thus accurate and reproducible from one apparatus to another. Withdrawal of the vessel and its repositioning do not require any particular manipulation.

According to an advantageous version of the invention, the means for detecting the presence of the vessel consists of mechanical transmission means cooperating with means for interrupting the feed circuit of the heating means and disposed in a manner to be activated by the vessel when the latter is placed in its operating position, said presence detecting means being provided in a manner to close said supply circuit when the vessel is correctly positioned.

The design of the control system permits in effect toleration without damage to the apparatus of nonconforming uses such as heating of the appliance in the absence of fat in the vessel or in the presence of an insufficient quantity of fat. Safety concerning the removable vessel can thus be limited to verifying the correct presence of said vessel.

BRIEF DESCRIPTION OF THE SEVERAL VIEWS OF THE DRAWING

The invention will be better understood from a study of the embodiment presented as a nonlimiting example and illustrated in the attached figures in which.

DETAILED DESCRIPTION OF THE INVENTION

Figure 1:
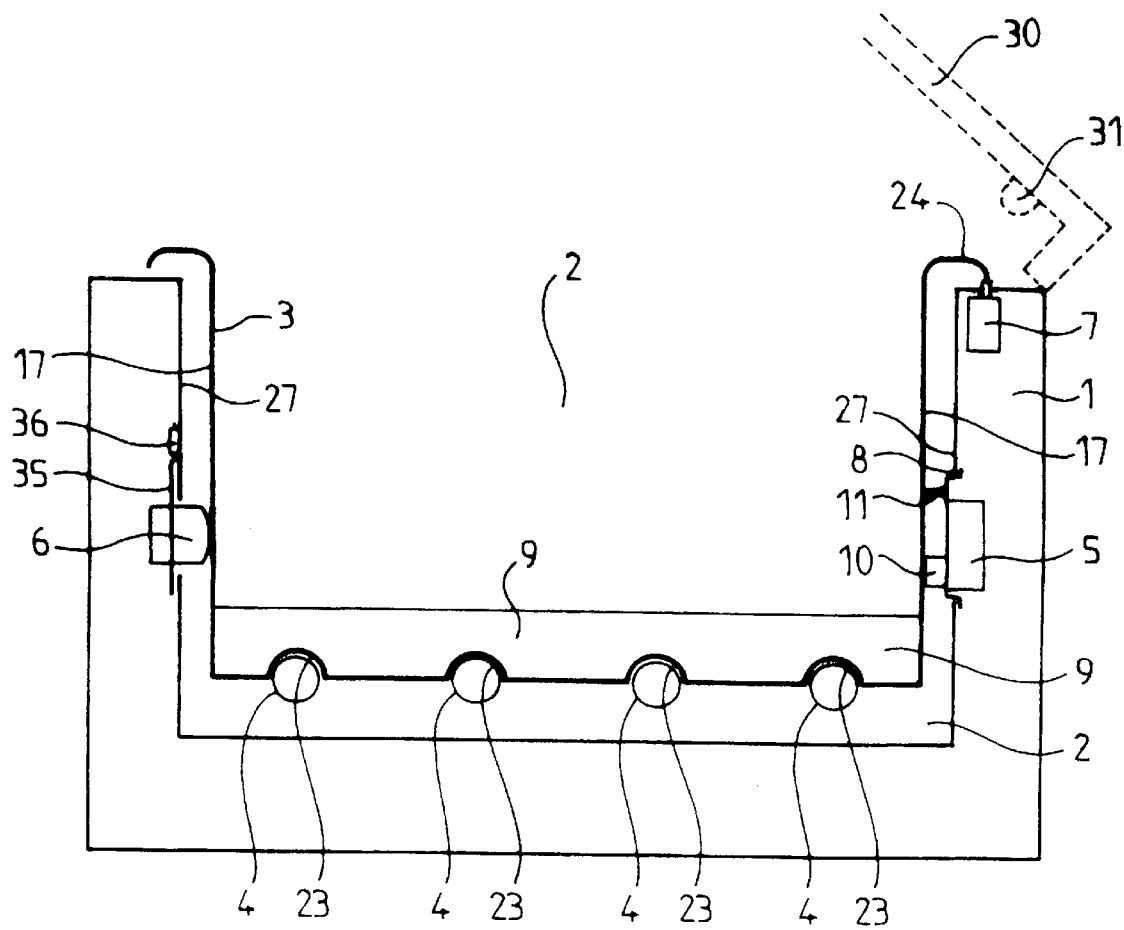
FIG. 1 is a schematic view in transverse cross-section of the apparatus, in which the electric connections are not represented.

The fryer such as illustrated particularly in FIG. 1 comprises in a known manner a frame 1 comprising a housing 2, a removable vessel 3 positioned in housing 2, heating means 4 disposed at the bottom of housing 2, control means 5 in thermal communication with vessel 3, overheating protection means 6 in thermal communication with vessel 3, means 7 for detecting the presence of vessel 3, advantageously a lid 30 furnished with a sealing joint 31.

Heating means 4 can consist for example of a sheathed heating element, which presents the advantage of an inexpensive fabrication and which offers good control possibilities. In a construction variation, heating means 4 can comprises several elements of this type.

The bottom of vessel 3 advantageously has recesses 23 which correspond in form substantially to that of heating means 4 in such a manner that vessel 3 when correctly positioned takes a stable position by coming in contact with heating means 4. This disposition permits assurance of a better thermal conduction between heating means 4 and vessel 3 in which cooking is performed. It also permits assurance of avoidance of errors, aiding the choice of the position of vessel 3, if for example vessel 3 has substantially the form of a parallelepiepid and the bottom of vessel 3 is asymmetric. The user desiring to place vessel 3 in the apparatus will spontaneously turn it by 180° if he sees that in the initial position the form of the bottom of vessel 3 does not correspond to the form of the heating means.

In an advantageous manner, the control means 5 and the overheating protection means 6 are disposed facing a lateral wall 17 of vessel 3. This disposition permits a space to be reserved under vessel 3 for implantation of heating means 4, and thus obtaining a more homogeneous heating of the totality of vessel 3.

Figure 2:
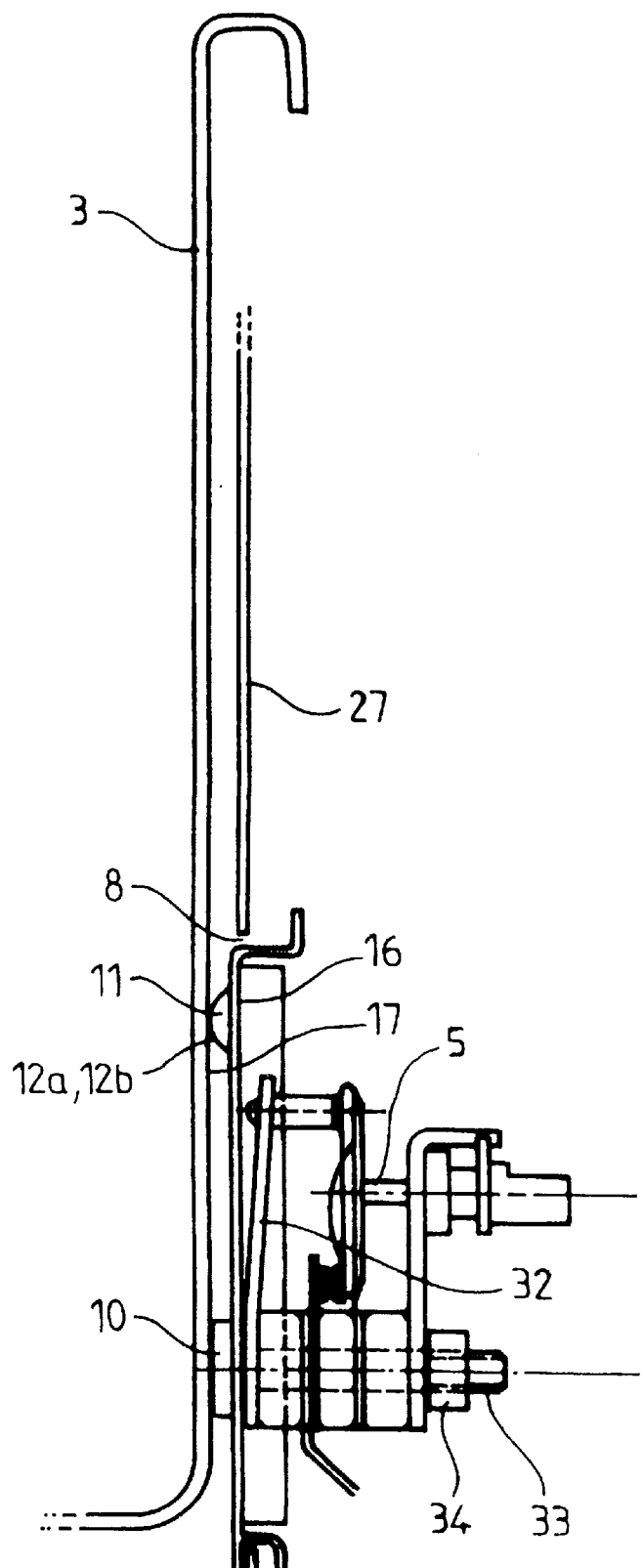
FIG. 2 is a partial transverse cross-section of the appliance, showing in detail an advantageous version of the mounting of the control means.

Control means 5 are advantageously constituted by a bimetal thermostat 32 such as shown in FIG. 2; electronic temperature control could also be envisioned. Preferably, said control means 5 are fixed on a plate 16 which bears against a lateral wall 17 of vessel 3 with the aid of a connecting element 10. Plate 16 is advantageously placed opposite a window 8 arranged in interior wall 27 of frame 1. Said interior wall 27 can be constituted in an advantageous manner by the wall of a counter-vessel made of metallic material.

Figure 3:
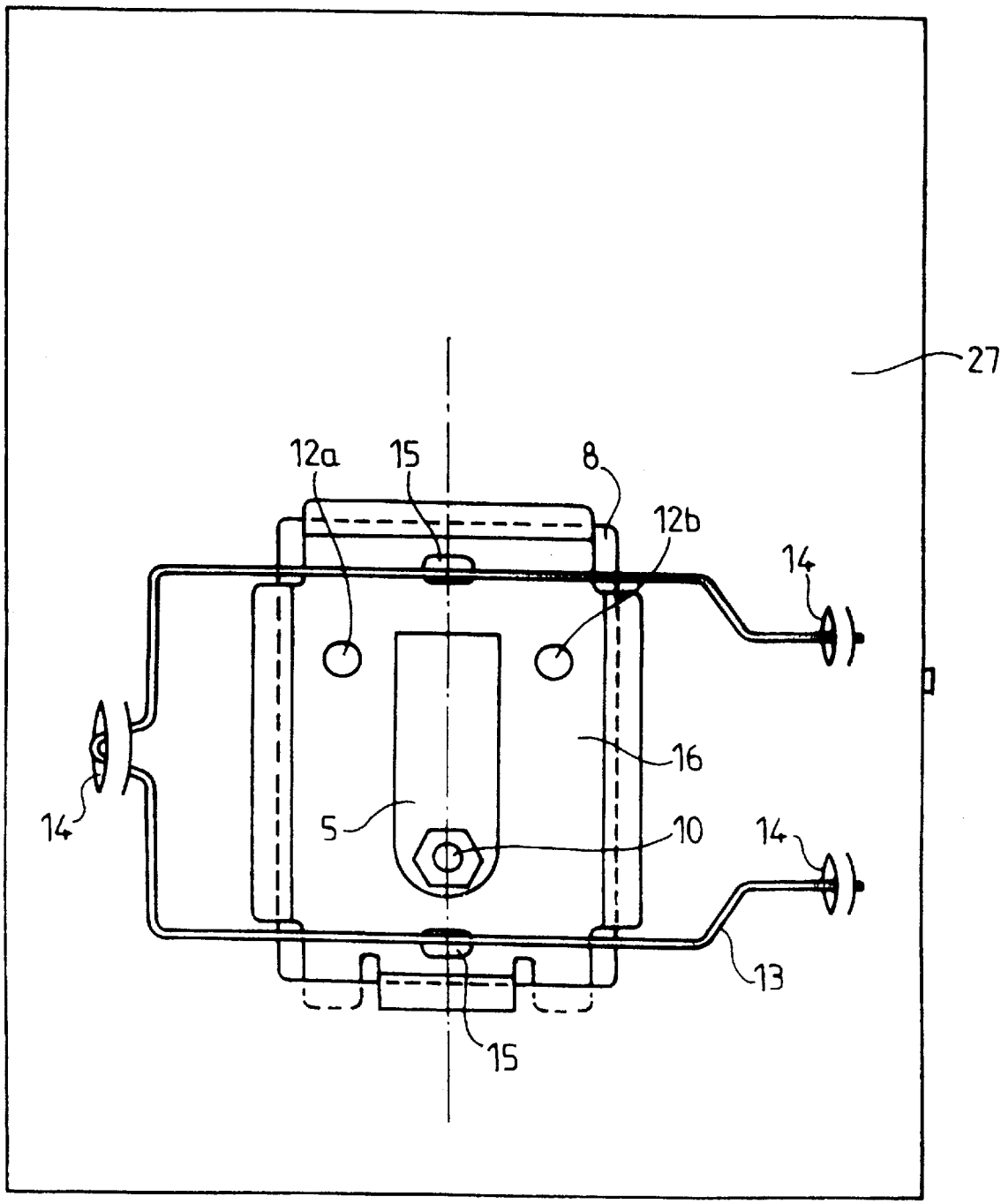
FIG. 3 is a front view of the arrangement of the control means on the internal face of the internal wall of the frame, in which said control means are represented in a schematic manner.

Connecting element 10 is advantageously constituted by a screw 33 having a flat head made of a material which is a good conductor of heat, the head of the screw being placed at the side of the vessel, said screw passing through the body of thermostat 32 and comprising at its free end a nut 34 assuring tightening, such as shown in FIG. 2. Preferably, plate 16 comprises positioning means 11 disposed to guarantee a reproducible contact of connecting element 10 with vessel 3 despite industrial fabrication tolerances. These positioning means 11 are advantageously constituted by 2 contact means 12a and 12b, which are made for example in a stamped form, such as shown in FIG. 3. Advantageously the height of the two contact means 12a and 12b is identical to that of connecting element 10 in such a manner that plate 16 is substantially parallel to lateral wall 17 of vessel 3.

The spacing between contact means 12a and 12b preferably selected to be greater than the diameter of connecting element 2 constituted for example by the flat head of screw 33 permits assurance of the positioning in a flat state of said connecting element 10 on lateral wall 17 of vessel 3, and thus guarantees a good thermal contact between vessel 3 and control means 5. Plate 16 is maintained flattened against lateral wall 17 of vessel 3 by an adjusting means preferably constituted by a substantially rigid metal wire 13. This wire 13 comes to bear on plate 16 preferably at the level of stampings 15, for example two in number. Wire 13 is fixed to interior wall 27 of frame 1 preferably with the aid of openings 14, for example three in number, formed in said wall 27, in which segments of said wire 13 come to be inserted.

The overheating protection means 6, advantageously constituted by a fuse, preferably come to bear against a lateral wall 17 of vessel 3. Said means 6 are advantageously maintained by an elastic support 35 inserted into an opening 36 of interior wall 27 of frame 1.

The means 7 for detecting the presence of vessel 3 are preferably constituted by mechanical transmission means 18 cooperating with means 19 for interrupting the circuit feeding heating means 4, said interrupting means 19 being for example constituted by a switch. The mechanical transmission means 18 consist for example of a piston 20 sliding in a housing 21, cooperating with a biassing means 22 such as a spring.

Figure 4:
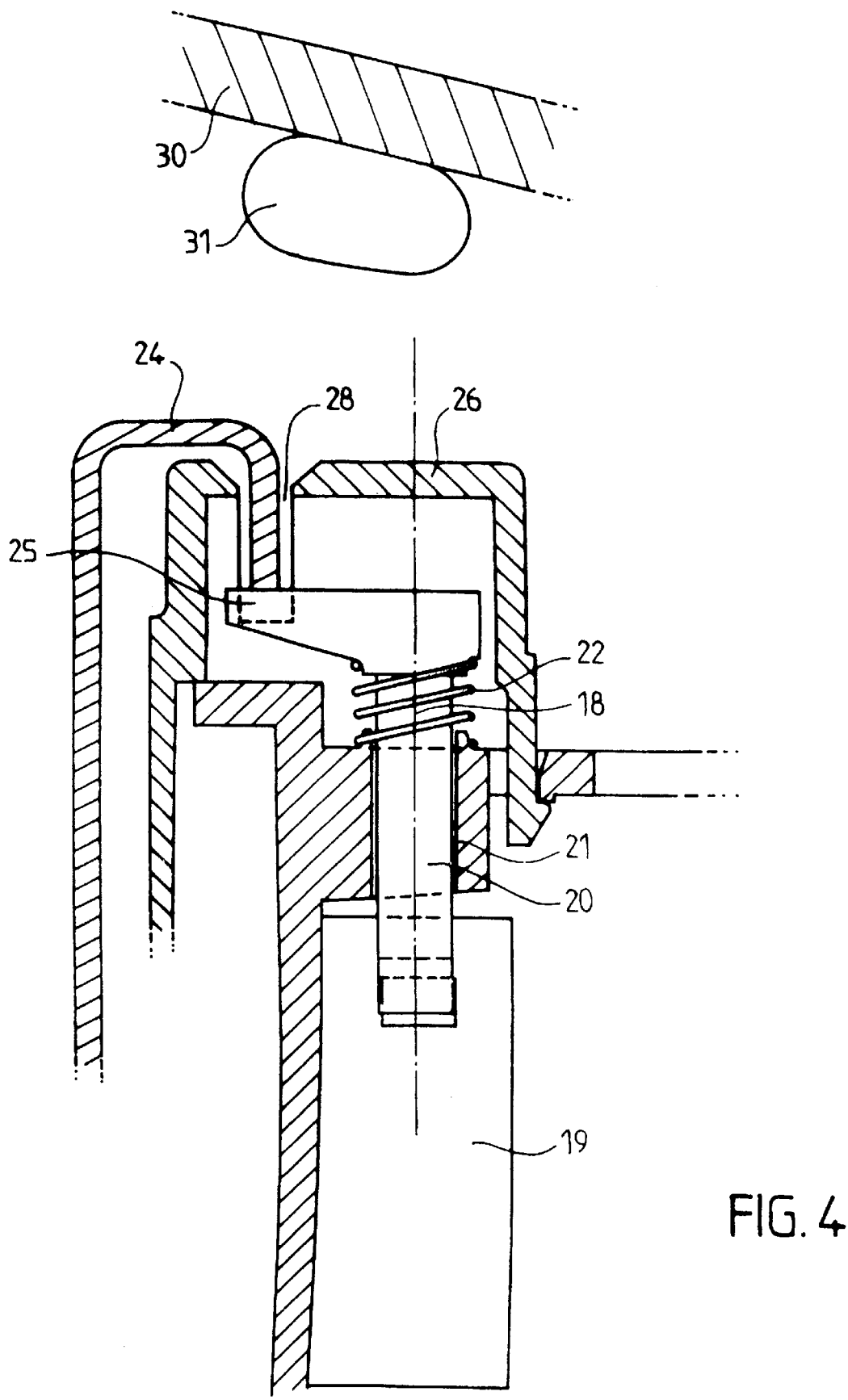
FIG. 4 is a partial cross-sectional view of the apparatus, showing in detail an advantageous version of the mounting of means for detecting the presence of the vessel.

Preferably, the peripheral edge 24 of vessel 3 is at last partially folded in its upper part. In this manner the contact surface between a peripheral edge 24 and mechanical transmission means 18 is limited. Advantageously said mechanical transmission means 18 are protected by a cover 26 having a groove 28. Groove 28 is disposed in manner such that edge 24 of vessel 3 correctly positioned in housing 2 comes to actuate said mechanical transmission means 18. In the embodiment shown in FIG. 4, edge 24 of vessel 3 comes to activate head 25 of piston 20. Preferably, the width of said groove 28 is provided in a manner to be slightly greater than the thickness of the edge 24 of vessel 3.

This arrangement permits avoidance of actuation by the user, in an involuntary or even a voluntary manner, of the mechanical transmission means 18, provoking closing of the circuit feeding heating means 4 and thus heating of said heating means, for example when he positions vessel 3 in place, or during any other manipulation, and risks being burned by introducing the hand into housing 2 after having withdrawn vessel 3.

Said disposition equally permits avoidance of activation of mechanical transmission means 18 by joint 31 of lid 30 during closing of said lid 30 when vessel 3 is absent from housing 2.

Removable vessel 3 is provided to receive a certain quantity of cooking cofactor 9, such as vegetable oil, animal fat, lard, margarine or any other fat material capable of use to perform frying, as well as the food to be fried.

Apparatus according to the invention functions in the following manner:

Upon installation of removable vessel 3 in housing 2, wire 13 and elastic support 35 press respectively, connecting element 10 of control means 5 and overheating protection means 6 against the walls of said vessel 3.

Preferably, vessel 3 is in position when recesses 23 present in the bottom of said vessel 3 are arranged in a manner to correspond to heating means 4.

When vessel 3 is correctly positioned, edge 24 actuates mechanical transmission means 18, for example by bearing on head 25 of piston 20, and said mechanical transmission means 18 actuate means 19 for interrupting the supply circuit of heating means 4 in a manner to close said circuit. The appliance is then able to function.

In case of a poor position of vessel 3, for example when vessel 3 is turned by 180° with respect to its correct position, recesses 23 do not correspond to heating means 4 and vessel 3 is in a raised position with respect to the correct position. Edge 24 cannot actuate mechanical transmission means 18, for example by bearing on head 25 of piston 20, and the interrupting means 19 remain in an open position. The apparatus cannot function.

In the absence of vessel 3, mechanical transmission means 18 are not actuated and interrupting means 19 are in an open position. The apparatus cannot function. Preferably, the presence of cover 26 prevents the closing of lid 30 from provoking actuation of the mechanical transmission means 18 by the intermediary of the sealing joint 31 of said lid 30.

When vessel 3 is present and correctly positioned, but in the absence of cooking cofactor 9, for example vegetable oil, animal fat, lard, margarine or any other fat material suitable for performing frying, or in the presence of a quantity which is less than the minimum indicated, situations in which there is a risk of overheating, the control means provoke an interruption of the supply circuit of heating means 4 before the overheating protection means 6 are activated. Overheating protection means 6 utilized in fryers being generally of the fuse type, this operating characteristic permits their irreversible degradation to be avoided. The user does not experience the inconvenience of having to have the apparatus repaired when it has been used with too small a quantity of fatty material, even when the apparatus has been placed in operation without having added fatty material.

The invention is not in any way strictly limited to the structural example described previously, but encompasses numerous modifications or improvements.

Notably, one can envision that the control means 5 and the overheating protection means 6 are placed on the same lateral wall 17 of the apparatus.

One can equally envision that the wire 13 serving as a means for adjustment of the plate 16 in order to place it flat against lateral wall 17 would not be one piece, but that it could be for example composed of two or more parts. One can also envision that plate 16 would be fixed to the frame and that only connecting element 10 would be movable to come in contact with the vessel. Moreover, one can envision that plate 16 itself serves as the thermal connection between vessel 3 and control means 5, by making said plate 16 of a material which is a good conductor of heat, for example an aluminum or copper alloy.

One can equally envision that the transmission means 18 would be completely integrated into the interrupting means 19, the mechanical part of said interrupting means 19 provided in order to be actuated by edge 24 of vessel 3 then being made of a material supporting the temperature levels attained by edge 24 of said vessel 3.

The invention finds its application in the technical field of apparatus for heating or cooking foods in particular for flying in an oil bath.

The invention claimed is:

1. Cooking apparatus, having a removable vessel (3) intended to contain a cooking medium (9) and food to be cooked, comprising a frame (1) in which is provided a housing (2) intended to receive the vessel (3), heating means (4) disposed at the bottom of said housing (2), control means (5) in thermal communication with the vessel (3) permitting control of the level of temperature of the vessel (3), overheating protection means (6) and thermal communication with the vessel (3) permitting to avoid that the level of temperature of the vessel (3) exceeding a pre-established safety threshold, means (7) for detecting the presence of the vessel (3), characterized in that the control means (5) are capable of provoking an interruption of the feed circuit of the heating means (4) before the overheating protection means (6) are activated, when the vessel (3) comprises less cooking medium (9) than a minimum quantity indicated.

2. Apparatus according to claim 1, in which the control means (5) are arranged in a wall of the housing (2) and comprise at least one connecting element (10) provided to assure a thermal communication between the control means (5) and the vessel (3) placed in operating position in the housing (2), said element being mounted to be movable in a manner to be able to project into the housing (2) beyond the wall of the housing (2) in the direction of the wall of the vessel (3).

3. Apparatus according to claim 2, in which the connecting element (10) is mounted on a plate (16) supporting the control means (5) and movably mounted with respect to the frame (1).

4. Apparatus according to claim 2, in which the connecting element (10) is disposed in a manner to exert a mechanical contact against the vessel (3) when the latter is placed in operating position.

5. Apparatus according to claim 3, in which the plate (16) comprises positioning means (11) with respect to the vessel (3), distinct from the connecting element (10), disposed to guarantee a reproducible contact of the connecting element (10) with the vessel (3).

6. Apparatus according to claim 5, in which the positioning means (11) consist of two contact means (12a, 12b).

7. Apparatus according to claim 3, in which the plate (16) is maintained against the vessel (3) when the latter is placed in operating position with the aid of adjustment means constituted by a substantially rigid metallic wire (13) coming on the one hand to be inserted into openings (14) formed in an interior wall (27) of the frame (1), and on the other hand to bear on stampings (15) of the plate (16).

8. Apparatus according to claim 1, in which the means (7) for detection of the presence of the vessel (3) consist of mechanical transmission means (18) cooperating with means (19) for interrupting the feed circuit of the heating means (4) and disposed in a manner to be actuated by the vessel (3) when the latter is placed in operating position, said presence detecting means (7) being provided in a manner to close said feed circuit when the vessel (3) is correctly positioned.

9. Apparatus according to claim 8, in which the vessel (3) comprises a peripheral edge (24) at least partially folded in its upper part in a manner to act on the presence detecting means (7) when the vessel (3) is correctly positioned.

10. Apparatus according to claim 9 in which the mechanical transmission means (18) are protected by a cover (26) comprising a groove (28).

11. Apparatus according to claim 10 in which the width of groove (28) is provided in a manner to be slightly greater than the thickness of edge (24) of vessel (3).

12. Apparatus according to claim 1, in which the exterior side of the bottom of the vessel (3) comprises recesses (23) whose form corresponds substantially to that of the heating means (4).

13. Apparatus according to claim 1, in which the means for control (5) and/or for overheating protection (6) are disposed against a lateral wall (17) of the vessel (3).

* * * * *